United States Patent [19]

Kaku et al.

[11] Patent Number: 4,694,469
[45] Date of Patent: Sep. 15, 1987

[54] METHOD AND DEVICE FOR TIMING PULL-IN OF RECEIVING EQUIPMENT

[75] Inventors: Takashi Kaku, Tama; Yasuhiro Arai, Kawasaki, both of Japan

[73] Assignee: Fujitsu Limited, Kawasaki, Japan

[21] Appl. No.: 870,546

[22] Filed: Jun. 4, 1986

[30] Foreign Application Priority Data

Jun. 4, 1985 [JP] Japan ............................... 60-120839
Jun. 7, 1985 [JP] Japan ............................... 60-123772

[51] Int. Cl.⁴ .......................... H04B 3/06; H04B 3/10
[52] U.S. Cl. .................................... 375/13; 375/118; 333/18
[58] Field of Search ..................... 375/12, 13, 14, 106, 375/118; 333/18

[56] References Cited

U.S. PATENT DOCUMENTS

| | | | |
|---|---|---|---|
| 4,227,252 | 10/1980 | Godard | 375/118 |
| 4,571,733 | 2/1986 | Kaku et al. | 375/13 |
| 4,599,732 | 7/1986 | LeFever | 375/13 |

Primary Examiner—Robert L. Griffin
Assistant Examiner—M. Huseman
Attorney, Agent, or Firm—Staas & Halsey

[57] ABSTRACT

A receiving equipment comprises a modulator, a timing extraction unit, a PLL unit, an impulse recovery unit, a fix-equalizer, and an automatic-equalizer. A timing pull-in operation is performed, in one way, by phase-rotating a timing signal of the timing extraction unit and sends the signal to the PLL unit, and in another way, by introducing an input signal of the timing extraction unit from the equalized output of the fix-equalizer.

14 Claims, 41 Drawing Figures

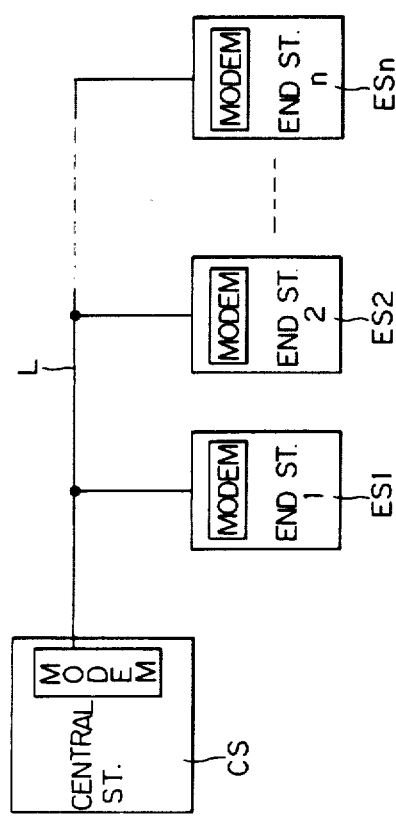
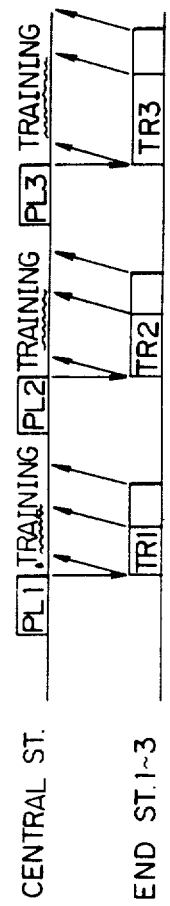
Fig.1
Fig.2

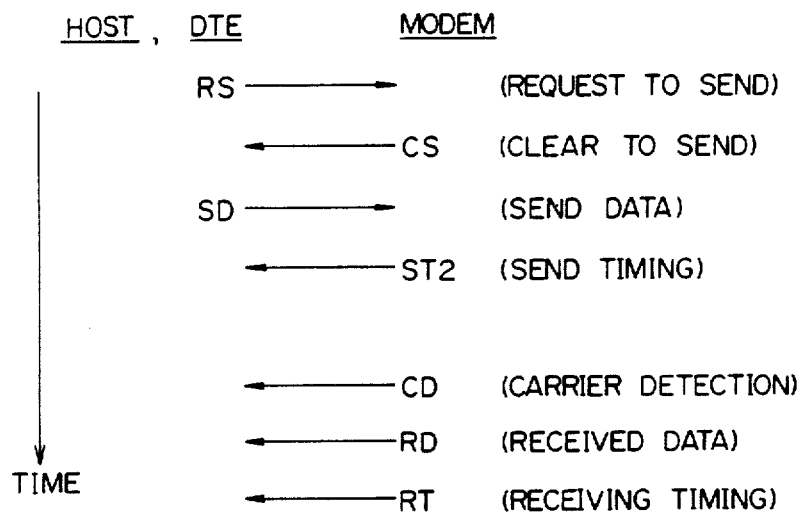
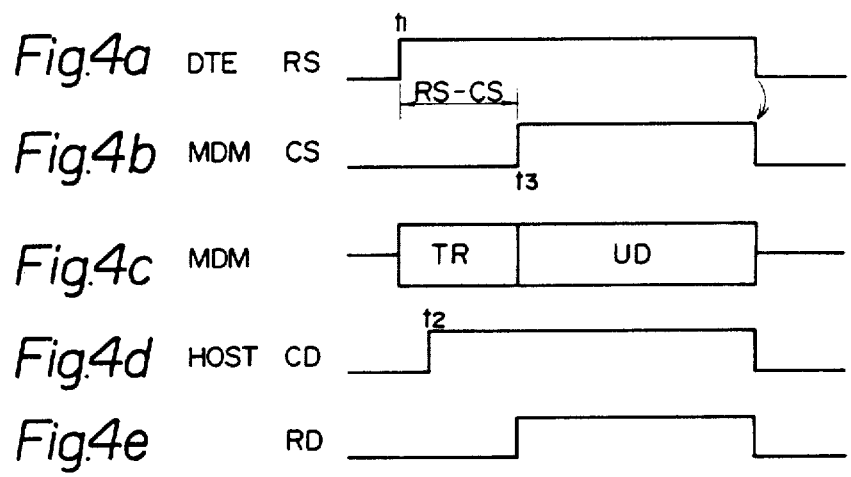

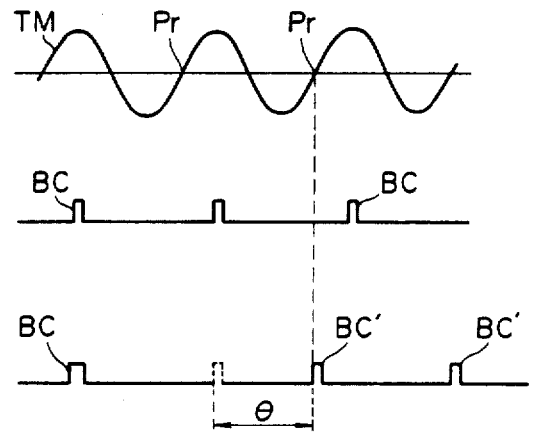
Fig.6A PRIOR ART
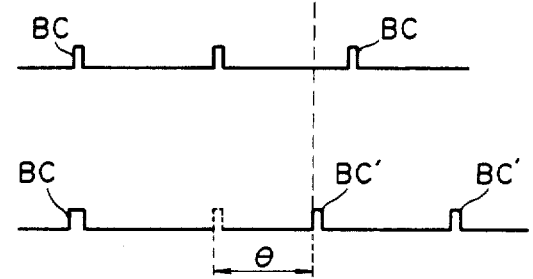
Fig.6B PRIOR ART
Fig.6C PRIOR ART
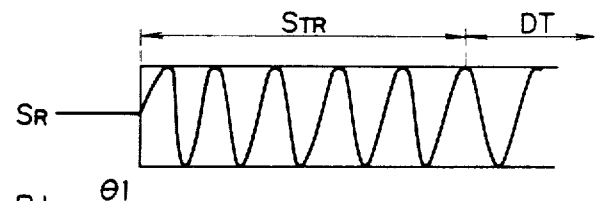
Fig.7A PRIOR ART
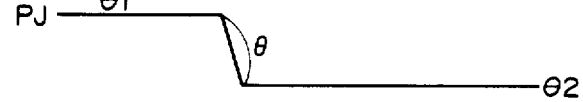
Fig.7B PRIOR ART
Fig.7C PRIOR ART Fig.13A  TRAINING SIG. PATTERN
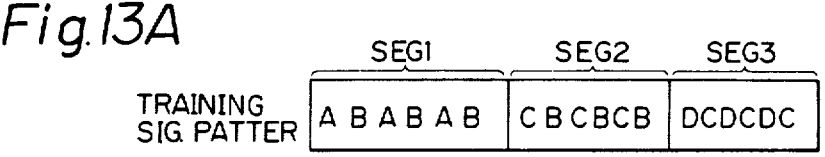
Fig.13B  IMPULSE RECOVERY
Fig.14
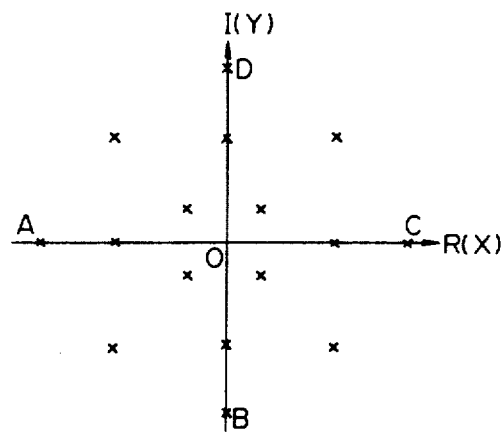

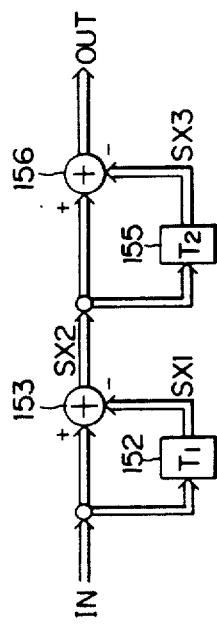

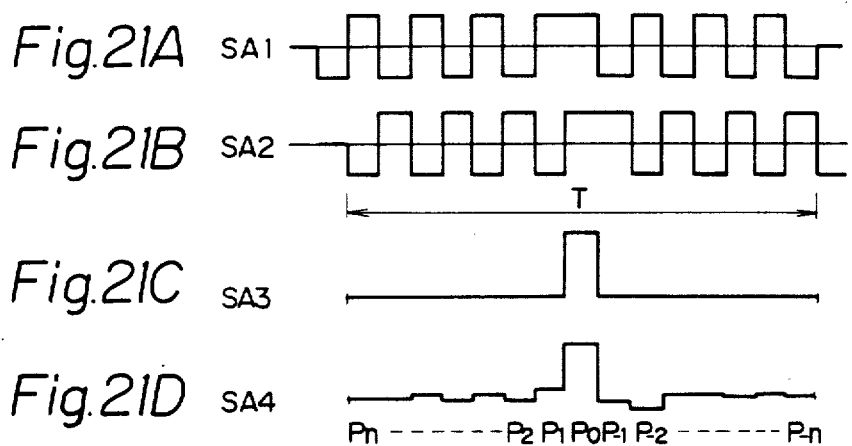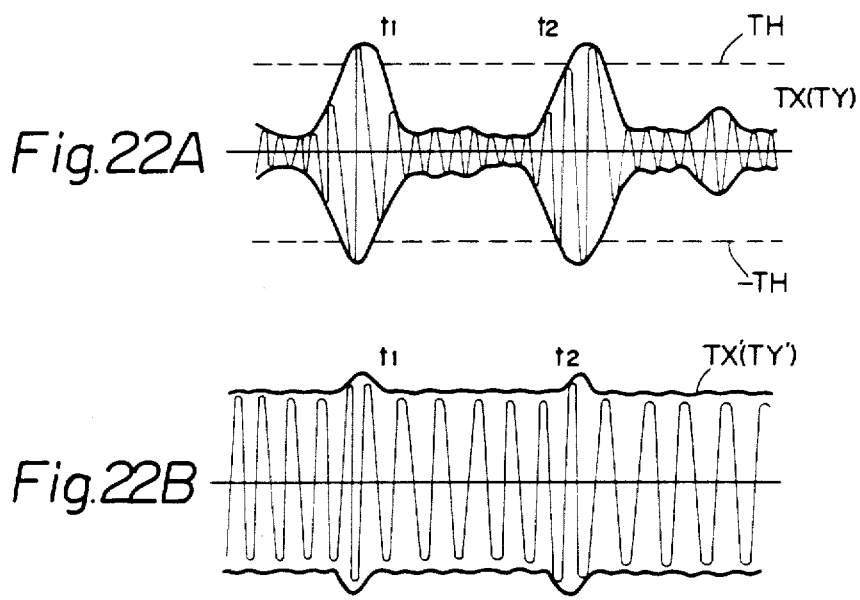

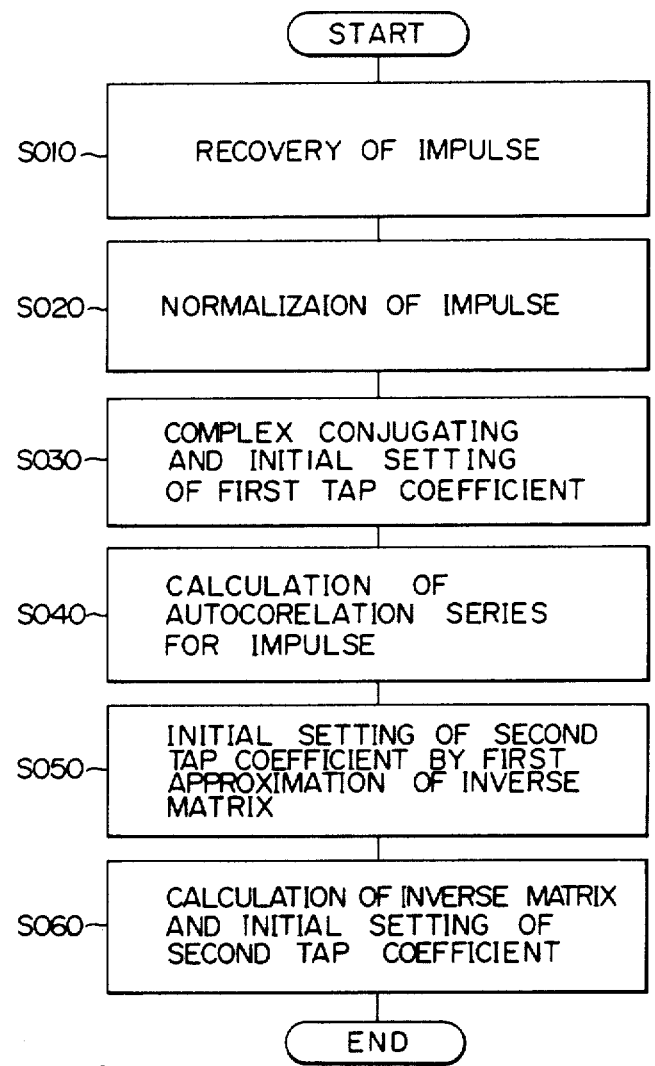

METHOD AND DEVICE FOR TIMING PULL-IN OF RECEIVING EQUIPMENT

BACKGROUND OF THE INVENTION

1. Field of the Invention

The present invention relates to a method and device for timing a pull-in of receiving equipment. For example, a receiver of a modulator-demodulator (MODEM) contains a timing pull-in device which is operative to pull-in an internal clock of the receiving equipment to a timing signal contained in the received signal. The timing pull-in operation is performed in such a manner that the internal clock is synchronized in both phase and frequency with the timing signal. More particularly, the present invention concerns an improved timing pull-in device able to complete the pull-in operation in a very short time.

2. Description of the Related Art

In recent years, it has been common practice to use existing telephone lines for data transmission. Existing telephone lines are usually analog lines in form. Therefore, it is necessary to employ a MODEM which modulates digital data signals into corresponding analog data signals and demodulates the latter signals into the former.

The problem is that the transmission characteristics of the telephone lines to which the MODEM is connected are, in general, not the same, and accordingly, a pull-in operation is essential for each MODEM. A pull-in operation is usually achieved by, first, sending a so-called training signal from a transmitter side to the receiver side every time data transmission is to be started. The internal clock of the MODEM is then synchronized with the timing signal contained in the training signal. After the pull-in operation, the MODEM can start inherent data processing correctly in response to the successive received data signal.

During this pull-in operation, sometimes other pull-in operations are performed in parallel, such as equalization of an automatic equalizer (EQL), automatic again control (AGC), and carrier automatic phase control (CAPC). Through the synchronous pull-in operations, as mentioned previously, the internal clock of the MODEM is synchronized in phase and frequency with the timing signal, i.e., baud rate clock, contained in the received signal at the MODEM. During the reception of the training signal, the pull-in operation regarding the phase is especially important.

In a prior art technique for a timing pull-in operation regarding the phase, a jump in the phase is executed. Namely, the difference in phase between the internal clock and the timing signal is cancelled by the jump in the phase of the internal clock.

The problem in the prior art pull-in technique is that an undesired transient response is produced for a short period immediately after the execution of the jump in phase. The thus produced transient response is inconvenient in that it becomes difficult to increase the data transmission efficiency by shortening the timing signal duration. In practice, such shortening is not possible due to the presence of the undesired transient response within the duration of the training signal, and therefore, that duration is necessarily extended for a period equal to that of the transient response. Then, where the duration of the training signal is required to be shorter than a prescribed value currently used, it is possible that the synchronous pull-in operation cannot be completed within the duration of the training signal due to the presence of the transient response.

SUMMARY OF THE INVENTION

Accordingly, an object of the present invention is to provide a synchronous pull-in process and circuit which can overcome the aforesaid problem, i.e., can substantially eliminate the transient response in the synchronous pull-in operation.

According to fundamental aspect of the present invention, there is provided a timing pull-in device of a receiving equipment comprising; means for sampling a received signal from a transmission line by a certain sampling timing and demodulating the received signal; means for extracting a timing signal from the demodulated signal; means for phase-rotating the extracted timing signal by an amount of rotation phase previously set; means for adjusting the sampling timing of the received signal by carrying out a phase-locked loop control on the basis of the phase-rotated timing signal; means for recovering an impulse from the demodulated signal; a first equializing means for fix-equalizing the demodulated signal by using a tap coefficient previously set; and a second equalizing means for automatic-equalizing the equalized output of the first equalizing means to obtain an output signal; wherein, at the time of an initial training of the receiving equipment, a training signal containing an impulse component is received from the transmitting line, the impulse is recovered from the training signal by the impulse recovering means, a complex conjugate of the recovered impulse is set to the first equalizing means as the tap coefficient for the fix-equalization, the tap coefficient for the automaticequalization is calculated from the recovered impulse to be initial-set to the second equalizing means, and the amount of the phase rotation is set to the phase rotating means so that the phase of the timing signal extracted by the extracting means coincides with the phase of an internal clock of the equipment.

According to another aspect of the present invention, there is provided a timing pull-in device of the receiving equipment comprising; means for sampling a received signal from a transmission line by a certain sampling timing and demodulating the received signal; menas for recovering an impulse from the demodulated signal; a first equalizing means for fix-equalizing the demodulated signal by using a tap coefficient previously set; a second equalizing means for automatic-equalizing the equalized output of the first equalizing means to obtain an output signal; means for extracting a timing signal from the equalized output of the first equalizing means; and, means for adjusting the sampling timing of the received signal by carrying out a phase-locked loop control on the basis of the extracted timing signal, wherein, at the time of an initlal training of the receiving equipment, a training signal containing the impulse component is received from the transmitting line, the impulse is recovered from the training signal by the impulse recovering means, a complex conjugate of the recovered impulse is set to the first equalizing means as the tap coefficient for the fix-equalization, and the tap coefficient for the automatic-equalization is calculated from the recovered impulse to be initial-set to the second equalizing means.

BRIEF DESCRIPTION OF THE DRAWINGS

The above object and features of the present invention will be more apparent from the following description of the preferred embodiments with reference to the accompanying drawings, wherein:

FIG. 1 shows a multi-point communication system;

FIG. 2 shows polling signals and transmitting signals on the line L in FIG. 1;

FIGS. 3 and 4a–4e are drawings for explaining the PS-CS time;

FIGS. 6a–6c and 7a–7c are waveforms of the signals shown in FIG. 5, respectively;

FIGS. 13a and 13b to 16 are drawings for explaining the training signal in more detail;

FIGS. 21A to 21D are drawings for explaining the impulse recovery;

FIGS. 22A and 22B are drawings for explaining the phase hold;

FIG. 23 is a flow chart for an initial setting;

DESCRIPTION OF THE PREFERRED EMBODIMENTS

Before describing the embodiments of the present invention, the prior art and the problems therein will be first described with reference to the related figures.

FIG. 1 shows a multi-point communication system constituted by a central station CS and end stations ES1 to $ES_n$, each station being provided with a MODEM. In this multi-point communication system, the central station CS and end stations ES1 to $ES_n$ are connected through a line L. The communications between the central station CS and end stations ES1 to $ES_n$ are performed by sending a polling signal from the central station CS to each of end stations ES1 to $ES_n$, in sequence through a downstream line, so that each of the end stations ES1 to $ES_n$ sends a data signal to the central station CS in sequence through an upstream line.

FIG. 2 shows polling signals from the central station CS and transmitting signals from each end station ES1 to $ES_n$ on the line L. As shown in FIG. 2, when the central station CS carries out a polling of each of the end stations ES1 to $ES_n$ through the downstream line, the end station ES1 to $ES_n$ receiving the polling signal transmits a response, indicating whether or not transmitting data exists, to the central station CS, and if transmitting data exists, successively transmits this transmitting data. The training of each MODEM at the end stations ES1 to $ES_n$ is carried out by using a carrier always transmitted through the downstream line for the polling from the central station CS.

On the other hand, the MODEM of the central station CS must be trained every time a data signal is received from each of the end stations ES1 to $ES_n$, since the characteristic of the line between the central station CS and each of the end stations ES1 to $ES_n$ is different, respectively. Therefore, each end station ES1 to $ES_n$ transmits a training signal for an initial pull-in of the MODEM of the central station CS, prior to the transmission of data.

Figure 25:
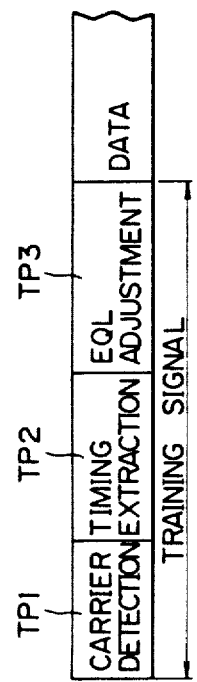
FIG. 25 is a format of the training signal.

That is, as shown in FIGS. 3 and 4, in the upstream line, when the end station receives the polling signal, if there is data to be sent, the data terminal equipment DTE of the end station sends an RS (Request to Send) signal to the MODEM thereof. In response to this RS signal, the MODEM of the end station transmits the training signal TR, shown in more detail in FIG. 25, to the MODEM of the central station CS through the upstream line to train the latter MODEM. Then the MODEM of the end station sends a CS (Clear to Send) signal to the DTE thereof at the appropriate time, when the training of the MODEM of the central station CS is finished, to enable transmission of the response and data.

The period from the RS time $t_1$ to the CS time $t_3$ is referred as the RS-CS time, and this indicates the time length of the training signal TR. The length of the RS-CS time depends on the duration of time necessary for the training of the MODEM of the central station CS. If this RS-CS time is long in comparison with the duration of time of the user data UD, the transmission efficiency is lowered.

Figure 5:
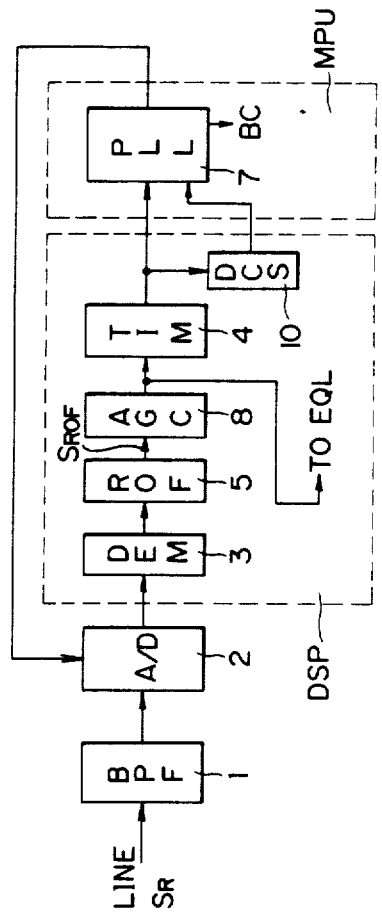
FIG. 5 shows a prior art timing pull-in device.

FIG. 5 is a block diagram of a receiving equipment having a prior art timing pull-in circuit. In FIG. 5, a received signal $S_R$ given via a transmission line (not shown) is first applied to a bandpass filter (BPF) 1. The band-restricted signal is then applied to an analog/digital (A/D) converter, in which the received analog signal from the filter 1 is sampled at every period of a predetermined sampling clock and then converted into the corresponding digital signal. The digital signal is then input to a digital signal processor DSP.

In the digital signal processor DSP, the output from the A-D converter 2 is demodulated by a demodulator (DEM) 3 and an output thereof is input to a roll-off filter (ROF) 5 as a low-pass filter having a roll-off characteristic, to shape the waveform of the baseband signal. The output from the roll-off filter 5 is subjected to automatic gain control by an automatic gain controller (AGC) 8 and then given to a timing extraction unit (TIM) 4 from which a timing signal is extracted from the AGC'ed signal. The thus extracted timing signal is applied to a decision unit (DCS) 10, which decides whether the internal clock is leading or lagging in phase with respect to the thus extracted timing signal.

It should be understood that the members 3, 4, 5, 8 and 10 of FIG. 5 are preferably set up as a digital signal processor DSP. When so set up, the DSP executes various processes as schematically illustrated by blocks 3, 4, 5, 8 and 10.

The above-mentioned decision unit 10 produces a decision output indicating lead or lag in the phase. The lead/lag decision output is input to a microprocessor MPU. The microprocessor MPU executes a process, among a variety of processes, equivalent to a phase-locked loop, as schematically illustrated by a phase-locked loop (PLL) 7 in FIG. 5. The output of the PLL 7 is adjusted in accordance with the lead/lag decision output, so that the output, i.e., the baud rate clock, of the PLL 7 is controlled to synchronize the baud rate clock in phase with the timing signal contained in the received signal $S_R$. The thus adjusted baud rate clock is used, in the related receiver unit, as the basic, internal clock, so that the receiver unit is synchronized, as a whole, with the timing signal contained in the received signal. The above-mentioned synchronous pull-in operation is further clarified below.

FIGS. 6A, 6B, and 6C depict waveforms of three signals TM, BC, and BC' appearing in FIG. 5. The waveform of FIG. 6A corresponds to the timing signal TM in the form of, for example, a sine wave. The waveform of FIG. 6B corresponds to the aforesaid baud rate clock BC. Each rising edge of baud rate clock BC must be finally synchronized with each rising point Pr of the timing signal TM. The baud rate clock BC is jumped in phase by $\theta$, as shown in FIG. 6C, which depicts the thus jumped baud rate clock BC'. That is, the phase of the initial clock BC is lagged by $\theta$ to obtain the clock BC'. The lag by $\theta$ is performed by a phase jump by the PLL 7, which is controlled by the aforesaid lead/lag output from the decision unit 10. It should be noted that it is also possible to obtain the shifted clock BC' through a lead in phase of the clock BC with respect to the phase of the timing signal TM. Thus, synchronous pull-in of the baud rate clock BC relative to the timing signal TM is performed.

The aforesaid sampling clock for the A/D converter 2 is generated from the baud rate clock BC in such a manner that the frequency of the sampling clock is n times the frequency of the clock BC. The number n is, for example, 4. Thus, the A/D converter 2 can sample the received signal to produce the corresponding digital signal in synchronization with the timing signal which is contained in this received signal. For this, the decision unit 10 operates to analyze the output from the timing extraction unit 4. In accordance with the thus detected phase, the decision unit 10 supplies, to the PLL 7, a command for executing the jump in the phase by $\theta$ for the baud rate clock BC. Thereby, the sampling clock for the A/D converter 2 is synchronized in phase with the timing signal TM contained in the received signal.

It should be noted that the phase jump is performed only in the duration of the training signal. During usual data transmission after the training signal duration, the PLL 7 operates to carry out a fine adjustment of the frequency in response to the lead/lag decision output given from the decision unit 10.

As mentioned above, according to the prior art technique, an instantaneous synchronous pull-in operation is achieved by a phase jump performed by the PLL 7. Accordingly, the sampling clock to be applied to the A/D converter 2, also is instantaneously changed in phase. The sudden change in phase necessarily creates an undesired transient response in the roll-off filter 5.

FIGS. 7A, 7B, and 7C depict waveforms of the signals $S_R$ and $S_{ROF}$ and a phase jump PJ appearing in FIG. 5 for explaining the transient response. The waveform of FIG. 7A corresponds to the received signal $S_R$, the head part which has the training signal $S_{TR}$. The training signal $S_{TR}$ is shifted in phase with the phase jump of $\theta$ for the pull-in operation. This is schematically illustrated by a change in status as a phase jump PJ in FIG. 7B, whereby the training signal $S_{TR}$ is changed in phase from $\theta_1$ to $\theta_2$ suddenly due to the change in the phase of the clock BC. Thus, the pull-in operation is achieved. Thereafter, however, an undesired transient response is induced in the output $S_{ROF}$ from the roll-off filter 5, which transient response is represented by TRES in FIG. 7C. In this case, the training data contained in the signal $S_{TR}$ during the transient response TRES is not available. That is, the training data received during the response TRES cannot be used for the pull-in operations for equalization (EQL), automatic gain control (AGC), and carrier automatic phase control (CAPC). Accordingly, in the prior art, the pull-in operations for EQL, AGC and CAPC must wait until the response TRES ends. The duration of the response TRES is generally as long as 3 to 5 ms.

Therefore, it is impossible to attain a highly efficient data transmission through shortening the training signal duration. To be specific, when it is required to shorten the term of the synchronous pull-in operation in the receiver unit, the existence of the response TRES acts as an impediment. The term of the synchronous pull-in operation is generally defined by the RS-CS time corresponding to the aforesaid training signal duration. Thus, the transient response TRES cannot be disregarded for the MODEM training. Thus, in the worst case, the receiver unit may fail in the synchronous pull-in operation. This can easily happen in a data transmission system set up with very poor quality transmission lines.

According to the present invention, the above-mentioned undesired transient response TRES can be minimized or substantially eliminated.

Figure 8:
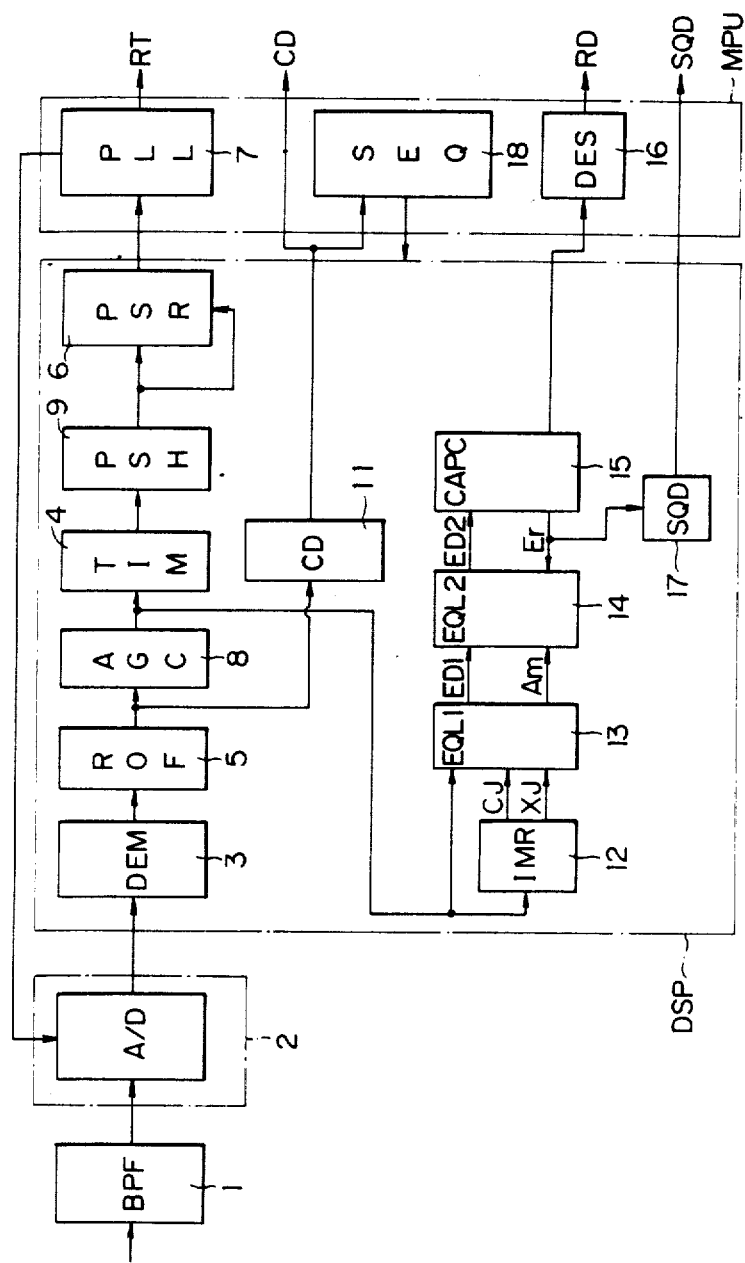
FIG. 8 shows an embodiment of a timing pull-in device according to the present invention.

Now, a preferred embodiment of the present invention will be explained. FIG. 8 shows a timing pull-in device according to the present invention. In FIG. 8, the reference numbers the same as in FIG. 5 denote components having the same function, respectively.

An impulse recovery unit 12 regenerates an impulse from an automatic equalization adjustment pattern containing an impulse component for the training, which will be explained in more detail later, and thereby obtains impulse series $P_j$ (j=1 ... n,) distorted by the line, and then calculates a normalized data series $X_j$ (j=1, 2, ... n) of the impulse series $P_j$ and calculates a tap coefficient series $C_j$ (j=1, 2, ... n) obtained by a complex conjugate of the normalized data series $X_j$. The normalized data series $X_j$ and the tap coefficient $C_j$ are then sent to a first equalizer 13. That is, in the impulse recovery unit 12, the recovered impulse series $P_j$ carries out the operation of the following formula (1) to obtain the tap coefficient $C_j$ of the first equalizer 13.

$$C_j = \frac{1}{\sqrt{\sum_{j=1}^{n} P_j^2}} \cdot P_j^* \qquad (1)$$

where; $P_j^*$ is a complex conjugate of $P_j$.

The first equalizer 13 and a second equalizer 14 constitute an automatic equalizer disclosed in the Japanese Unexamined Publication No. 58-121838, which can perform high speed initialization. In this kind of automatic equalizer, the first equalizer 13 is set as the tap coefficient $C_j$ by the complex conjugate of the impulse response so as to operate as the fixed equalizer, whereby the second equalizer 14 becomes a symmetric equalizer with the content of a symmetric matrix so that the initial setting of inverse characteristics for the impulse signal asymmetrical with respect to time is carried out after the impulse signal is made a symmetrical impulse signal.

This is, the first equalizer 13 is the kind of transversal filter which is set by the tap coefficient $C_j$ from the impulse recovery unit 12, and thereby fix-equalizes the demodulated signal from the AGC unit 8. An equalized output signal of this first equalizer 13 assumes an auto-correlation series, therefore the first equalizer 13 outputs the output signal having symmetry. That is, the equalized output signal ED1 of the first equalizer 13 is obtained as follows.

$$ED1 = \sum_{j=1}^{n} C_j \cdot P_j = \sum_{j=1}^{n} \frac{1}{\sqrt{\sum_{K=1}^{n} P_K^2}} \cdot P_j^* \cdot P_j \quad (2)$$

$$= \frac{1}{\sqrt{\sum_{K=1}^{n} P_K^2}} \sum_{j=1}^{n} P_j^* \cdot P_j$$

This formula (2) shows that the equalized output signal ED1 becomes the autocorrelation series. The phase component term in the equalized output signal ED1 is completely eliminated due to the existence of the term ($P_j^* \cdot P_j$). That is, the equalized output signal ED1 having no relation to the sampling phase at the A/D part 2 is obtained, since the first equalizer 13 has the autocorrelation series. In other words, the discord of the phase between the timing signal in the received signal and baud rate clock of the PLL 7 does not influence the equalized output signal ED1 of the first equalizer 13. This means that the timing pull-in operation is carried out instantaneously.

A second equalizer 14 automatically equalizes the equalized output signal ED1 of the first equalizer 13 to output an equalized output signal ED2 as an output data. This second equalizer 14 calculates an inverse matrix of the autocorrelation series $A_m$ obtained from the first equalizer 13, then obtains a n-th approximation, whereby the tap coefficient $B_j$ is determined to be set.

A phase holder (PSH) 9 holds the timing signal extracted by the timing extraction unit 4 when the amplitude of the extracted timing signal is small, at the phase state when the amplitude thereof is large, and normalizes the amplitude thereof.

A phase rotator (PSR) 6 calculates the complex conjugate $e^{-j\theta}$ for the phase $e^{j\theta}$ of the timing signal extracted by the timing extraction unit 4, then holds it as the phase rotation value at the end of training, whereby the phase of the extracted timing signal is rotated by the timing extraction unit 4 by the held rotation value so that the phase of the extracted timing signal input to the PLL 7 becomes zero.

A carrier detection unit 11 detects the carrier of the received signal to output a carrier detection (CD) signal to indicating the existence of the received signal. An decision unit 15 decides the data from the equalized output signal of the second equalizer 14. The decision unit 15 makes a decision on the data from the equalized output ED2 of the second equalizer 14 and corrects the tap coefficient $B_j$ of the second equalizer 14 by the error Er of the decision data and the equalized output ED2. A descrambler 16 descrambles the data scrambled at the transmission side, restores it to the original transmission data, and outputs it as received data. A signal quality detector (SQD) 17 integrates the error Er from the decision unit 15, monitors the quality of the data, and issues a signal quality detection (SQD) output. A sequencer (SEQ) 18 receives a CD signal from the carrier detector 11, detects that there is a received signal, and starts the training operation in the relevant portion.

Figure 10:
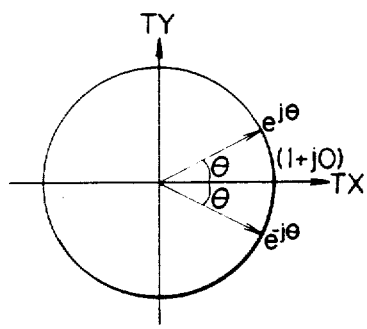
Figure 11:
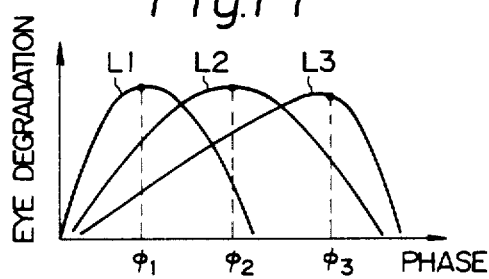
Figure 12:
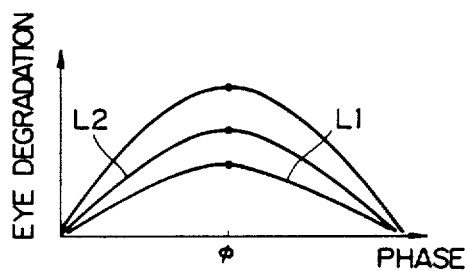

Next, an explanation will be given of the operation of the device illustrated in FIG. 8 with reference to views for explaining the operation, given in FIGS. 9A to 9D, a view for explaining the phase rotation, given in FIG. 10, and views for explaining pull-in, given in FIGS. 11 and 12.

The received signal $S_R$ is sent from the transmission side. The training signal TR in the received signal $S_R$ consists of a timing component shown in FIG. 9B and impulse components IMP shown in FIG. 9C, superimposed. Further, the data DATA has the waveform shown in FIG. 9B.

If the receiving side receives the signal $S_R$ given through the line L, the analog received signal $S_R$ is band-restricted by the band-pass filter 1, converted to a digital signal by the analog/digital converter 2, demodulated by the demodulator 3, and waveform shaped by the roll-off filter 5. Using the output from the roll-off filter 5, the carrier detector 8 detects the carrier, issues a CD signal, and detects the start of the transmission. Due to this, the sequencer 18 outputs the initialization start instructions to the relevant portions. The sequencer 18 first of all causes the initialization of the automatic gain controller 8 by the training signal TR.

Figures 9A, 9B, 9C, 9D:
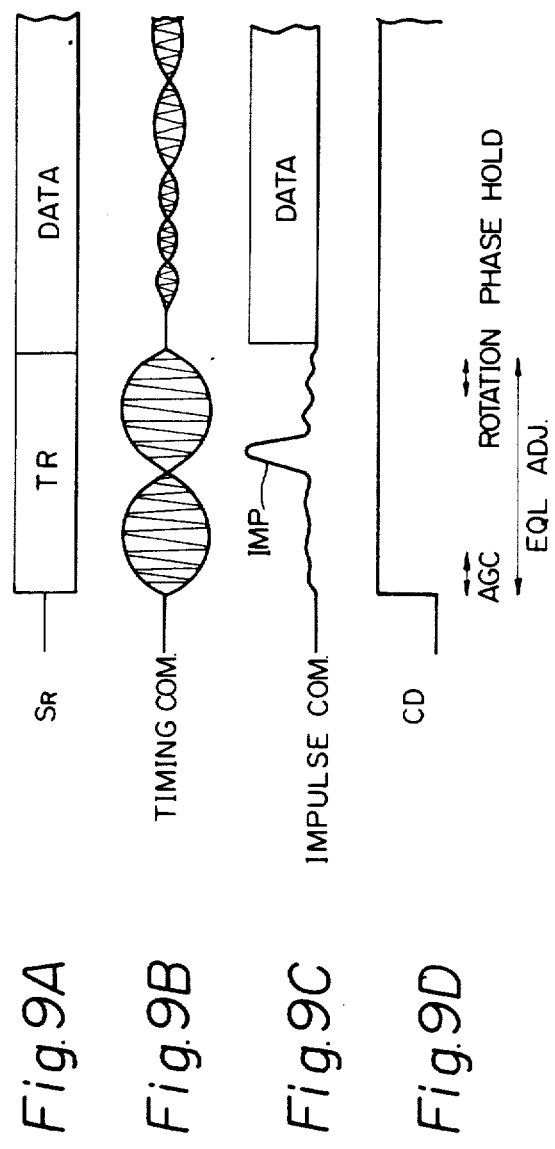
FIGS. 9a–9d to 11 are drawings for explaining the operation of the device of FIG. 8.

The output of the roll-off filter 5 is subjected to automatic gain control by the automatic gain controller 8, whereafter its timing component is extracted as shown by FIG. 9B by the timing extraction unit 4. From the demodulated output of the AGC 8, the normalized impulse $X_j$ is recovered at the impulse recovery unit 12. As explained later, the complex conjugate is found from the normalized impulse $X_j$ and this is set as the tap coefficient $C_j$ into the first equalizer 13.

Therefore, the first equalizer 13 assumes an autocorrelation, whereby the phase of the equalized output ED1 thereof becomes always zero. Accordingly, the equalizing operation is carried out normally even if the phase of the timing signal of the received signal and the phase of the sampling clock from the phase-locked loop 7 are different at the A/D converter 2. In other words, the timing pull-in is carried out instantaneously. The first equalizer 13 finds the autocorrelation series $A_m$ from the normalized impulse $X_j$ and the tap coefficient $C_j$ and sends this to the second equalizer 14 for initialization.

On the other hand, the timing component of the timing extraction unit 4 is given to the phase rotator 6 via the phase holder 9, and thereby the timing phase $e^{j\theta}$ is detected at the end of the training, and the complex conjugate $e^{-j\theta}$ is held as the phase rotation amount at the phase rotator 6. Therefore, there is a phase rotation of $(1+j0)$ by $e^{-j\theta}$ with respect to the timing component of the phase $e^{j\theta}$ during the reception of the data. That is, the timing component with a ZERO phase is input to the phase-locked loop 7. There are sequentially controlled by the sequence control of the sequencer 18. The automatic equalization adjustment pattern (training signal) is used for AGC pull-in, timing pull-in, and automatic equalization pull-in. Therefore, the first equalizer 13 exhibits autocorrelation without regard to the sampling phase, so, as shown in FIG. 11, the optimal phases $\phi_1$, $\phi_2$, $\phi_3$ do not change in accordance with the line characteristics $L_1$, $L_2$, and $L_3$, which exhibit conventional phase eye pattern degradation characteristics. As shown in FIG. 12, it is possible to obtain optimal values of the same timing phase $\phi$ without regard to the line characteristics $L_1$ to $L_3$ and setting of the optimal parameters is easy.

At this stage, the first equalizer 13 has the complex conjugate of the impulse response set and fix-equalized, so the second equalizer 14 is a symmetrical equalizer with a symmetrical matrix. Therefore, the second equalizer 14 has initialization characteristics that are the reverse of those of the temporarily asymmetric impulse signal initialized symmetrically with respect to time, so the time required for initialization is shortened. Therefore, the training signal TR can be shortened and, therefore, the RS-CS time can be greatly reduced.

On the other hand, the timing extraction unit 4 extracts the timing component from the results of the demodulation, i.e., the output of the automatic gain controller 8, so the timing phase at the time of pull-in must be held and the phase corrected. For this reason, the timing phase $e^{j\theta}$ at the time of pull-in is held by the phase rotator 6, the complex conjugate $e^{j-\theta}$ is obtained, and the extracted timing component of the timing extraction unit 4 is phase rotated. As a result, the input of the phase-locked loop 7 is continually held at the phase of the time of pull-in and a frequency follow-up control alone can be performed.

In this way, using the training signal, a training series is performed, i.e., carrier detection, AGC adjustment, timing pull-in, and equalization adjustment.

A usual data reception operation is performed as follows:

The data signal DATA following the training signal TR is demodulated in the same way as described above by the band-pass filter 1, analog/digital converter 2, demodulator 3, roll-off filter 5, and automatic gain controller 8 and is input to the timing extraction unit 4 and the first equalizer 13, and at the first equalizer 13, it is fix-equalized by the set tap coefficient $C_j$. The equalized output ED1 is input to the second equalizer 14, where it is automatically equalized, and the equalized output ED2 is judged by the decision unit 15. The error Er from the decision unit 15 is used for correction of the tap coefficient of the second equalizer 14. The output data from the decision unit 15 is descrambled by the descrambler 16 and is output as the received data RD.

On the other hand, the timing extraction unit 4 extracts the timing component from the demodulated signal from the automatic gain controller 8. The phase is rotated by exactly the pull-in phase at the phase rotator 6 and the phase-locked loop 7 controlled. As a result, the phase-locked loop 7 carries out the frequency control by the phase jitter, i.e., frequency deviation, and carries out the frequency follow-up control of the sampling clock of the A/D converter 2. The operation for reception of a transmitted signal is performed in this way. Further, when the signal quality detector 17 integrates the error Er and the integrated value reaches a predetermined value, the quality degradation signal SQD is sent, whereupon the quality degradation is evaluated.

As described above, in the pull-in device according to the present invention, in order to pull the baud rate clock into the timing signal, the extracted timing component input to the phase-locked loop 7 is rotated in phase, instead of phase-jumping the sampling clock of the A/D converter 2. Accordingly, the transient response due to the phase-jump of the sampling clock at the A/D converter 2 does not occur, and as a result, the training time may be shortened.

A more detailed constitution of the pull-in circuit shown in FIG. 8, and the operation thereof, will now be described. First, an example of the training pattern signal transmitted from the transmission side will be explained. FIGS. 13, 14, and 16 are views for explaining the training pattern in an embodiment of the present invention, and FIG. 15 is a block diagram explaining impulse recovery.

The training pattern is 16 QAM signal and comprised of three segments SEG1, SEG2, and SEG3, as shown in FIG. 13A. Below, an explanation will be made of the pattern of each segment.

The first transmission pattern of the training pattern, i.e., the segment SEG1, preferably satisfies the following conditions: (1) CD detection is easy, (2) AGC (automatic gain control) pull-in can be performed at high speeds (i.e., the data of the line level can be extracted accurately), and (3) there is a timing component. The pattern which satisfies these three conditions is one in which the phase of FIG. 14 is shifted 90 degrees and assumes alternately points A and B of the same amplitude. As the training start pattern of segment SEG1, an "AB" pattern comprised of the six symbols "ABABAB" is used.

Next, the segment SEG2 must be a pattern able to recover the first impulse together with the segment SEG1. On the other hand, the impulse recovery algorithm at the reception side, delays the input, i.e., received signal, by one symbol's worth of time by the tap 152, as shown in FIG. 15, obtains the sum with the received signal by the adder 153, which is further delayed by one symbol's worth of time by the tap 155, and then obtains the difference from the added output by the adder 156 to recover the impulse. Therefore, the segment SEG2 is designated as "$X_1, X_2, X_3, X_4, X_5, X_6$" and the optimal symbols for the impulse recovery are determined with reference to FIG. 16. The input IN, comprised of the segments SEG1 and SEG2, is "A, B, A, B, A, B, $X_1, X_2, X_3, X_4, X_5, X_6$". If a one-symbol shift exists at the tap T1, it becomes $SX_1$. Therefore, the added output at the adder 153 becomes $SX_2$.

Further, if the added output $SX_2$ is shifted by one symbol's worth by the tap 155, it becomes $SX_3$. When the difference is obtained by the adder 156, the output OUT of the difference becomes "A, B, 0, 0, 0, 0, $X_1-A$, $X_2-B$, $X_3-X_1$, $X_4-X_2$, $X_5-X_3$, $X_6-X_4$, $-X_5$, $-X_6$".

Therefore, $X_1$ to $X_6$ for recovery of the first impulse Z of FIG. 13B are determined as follows with reference to the QAM pattern of FIG. 14:

| | |
|---|---|
| $X_1 - A = Z$ | $\therefore X_1 = -A$ |
| $X_2 - B = 0$ | $\therefore X_2 = B$ |
| $X_3 - X_1 = 0$ | $\therefore X_3 = X_1 = -A$ |
| $X_4 - X_2 = 0$ | $\therefore X_4 = X_2 = B$ |
| $X_5 - X_3 = 0$ | $\therefore X_5 = X_3 = -A$ |
| $X_6 - X_4 = 0$ | $\therefore X_6 = X_4 = B$ |

The maximum power of $X_1-A$ is obtained with $X_1=-A$, so is with the point C rotated 180 degrees from the point A in the phase plane of FIG. 14. Therefore, $X_1=X_3=X_5=-C$. On the other hand, $X_2, X_4, X_6$ is the point B rotated 90 degrees from the point C. In this way, the pattern of the segment SEG2 for recovering the first impulse Z can be found from the "CB" pattern comprised of the six symbols "CBCBCB".

If the segment SEG1 is determined as an "AB" pattern and the segment SEG2 as a "CB" pattern in this way and the segment SEG3 is similarly sought in the same way as above as a pattern enabling recovery of a second impulse with the segment SEG2, then the segment SEG3 becomes a "DC" pattern comprised of six symbols "DCDCDC".

The training pattern becomes as shown in FIG. 14. The patterns in the segments SEG1, SEG2, and SEG3 are comprised of points perpendicularly intersecting in the phase space in FIG. 14. Among the segments SEG1, SEG2, and SEG3, it should be noted, one of the component points of a former segment is included as one of the component points of a latter segment.

On the other hand, if the segment SEG2 is $X_2-B=Z$ (impulse), then $X_2=-B$ and $X_1=A$, $X_3=A$, $X_4=X_2=-B$, $X_5=X_3=A$, $X_6=X_4=D$ and the pattern may be a "DA" pattern comprised the six symbols "DADADA" too. In this case, either the "DC" pattern or the "BA" pattern may be selected for the segment SEG3.

In this way, as shown in FIG. 13A, the segments SEG1, SEG2, and SEG3 are used for the recovery of the second impulse.

Figure 17:
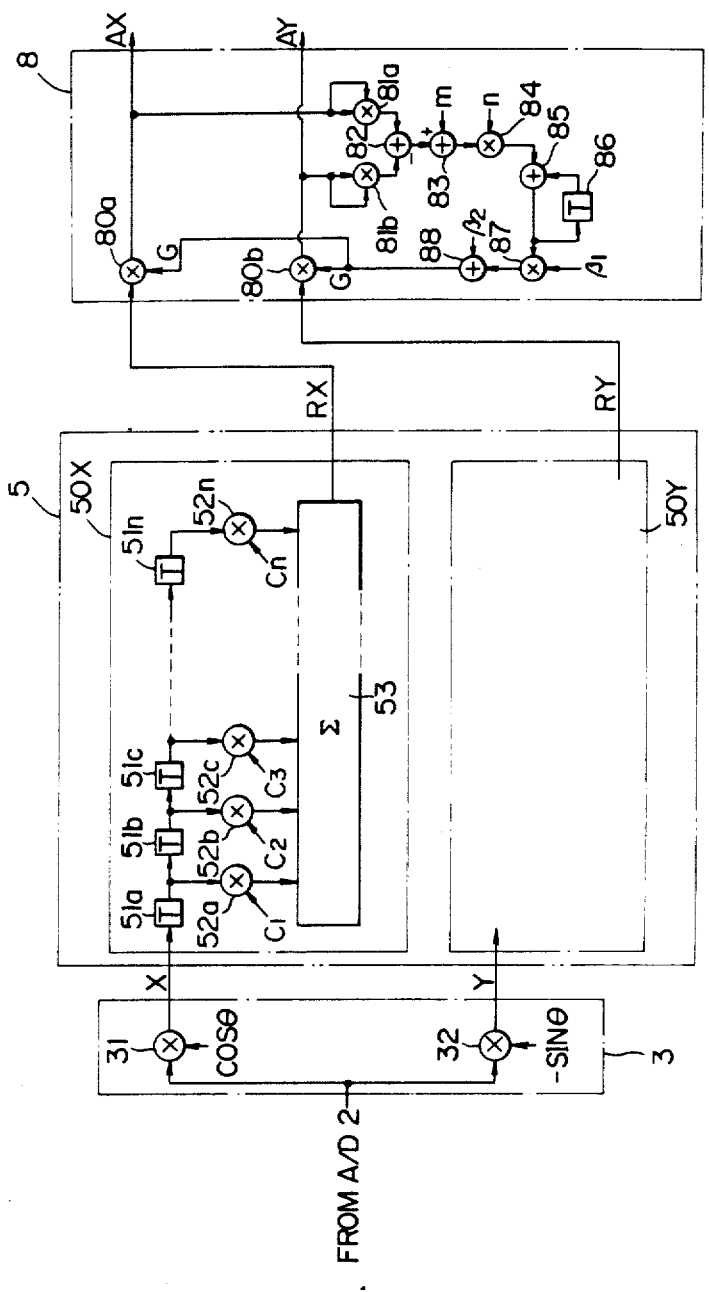
FIGS. 17 to 20 show each of the blocks of FIG. 8 in more detail, respectively.

FIG. 17 shows detailed equivalent circuit diagrams of the demodulator 3, the roll-off filter 4, and the automatic gain controller 8. In FIG. 17, 31 and 32 are multipliers for demodulating and outputting a real part component X and an imaginary part component Y by multiplying carriers $\cos\theta$ and $-\sin\theta$ respectively. 50X is an X side roll-off filter 50X comprising n stages of delay circuits (taps) $51_a$ to $51_n$, multipliers $52_a$ to $52_n$ for multiplying tap coefficients $C_l$ to $C_n$ with the outputs of delay circuits $51_a$ to $51_n$, and an adder 53 for adding the outputs of multipliers $52_a$ to $52_n$. 50Y is a Y side roll-off filter 50Y having the same components as those of the X side roll-off filter 50X.

The automatic gain controller 8 comprises multipliers $80_a$ and $80_b$ which multiply a gain G with outputs RX and RY of the roll-off filter 5, multipliers $81_a$ and $81_b$ which multiply RX and RY by a square thereof, an adder 82 which adds outputs of the multipliers $81_a$ and $81_b$ to obtain the power, an adder 83 which subtracts the output power of the adder 82 from the reference voltage m, a multiplier 84 which multiplies a feedback coefficient n to obtain a feedback amount (error amount), an adder 85 and a tap 86 which constitute an integrating circuit or averaging circuit to integrate the amount of error, a multiplier 87 which multiplies a predetermined coefficient $\beta_1$, and an adder 88 which adds a predetermined coefficient $\beta_2$ to the limit, thus producing a gain G. The digital automatic gain controller constituted by these components is well known, and since the operation thereof is also well known, a detailed explanation thereof is omitted herein.

Figure 18:
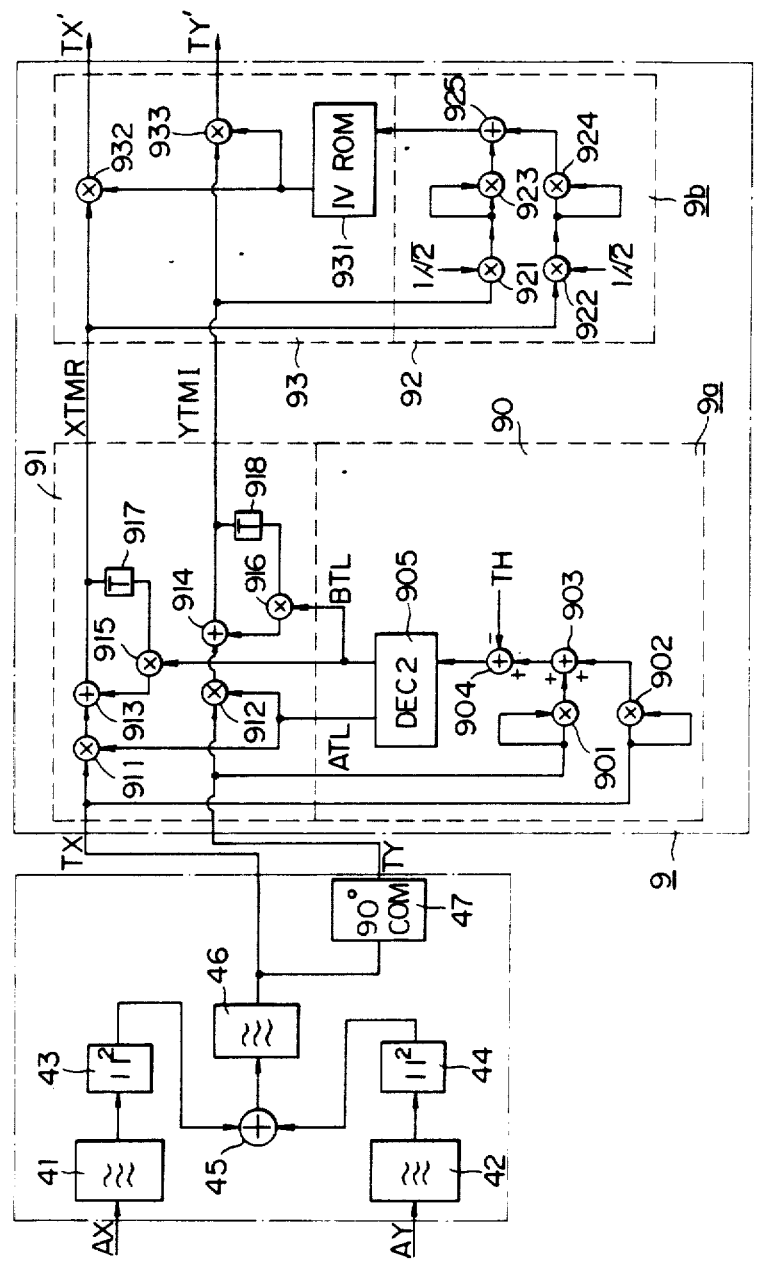

FIG. 18 is a detailed circuit diagram of the timing extraction unit 4 and the phase holder 9 illustrated in FIG. 8. In the figure, reference numerals the same as those shown in FIG. 8 indicate the same parts. Reference numerals 41 and 42 are timing extraction filters, for example, 1200 Hz band filters, which extract the timing components of the band of the timing signals in the real part and imaginary part AX and AY from the automatic gain controller 8. Reference numerals 43 and 44 are squaring circuits which square the output of the filters 41 and 42. Reference numeral 45 is an adder, which adds the outputs of the squaring circuits 43 and 44 and obtains the power of the timing component. Reference numeral 46 is a low pass filter, for example, a 2400 Hz band pass filter, which eliminates the alternating component in the signal from the adder 45 and outputs the timing component TX. Reference numeral 47 is a 90 degree component detector, which outputs the Y timing component TY rotated 90 degrees from the X timing component TX of the low pass filter 46.

The phase holder 9 is provided to replace a small amplitude signal of the timing component with a large amplitude signal of the prior timing component, to prevent an increase of the phase jitter due to the frequency adjustment by the small amplitude signal. The phase holder 9 compares the timing components TX and TY timing extracted at the timing extractor 4 with a predetermined threshold TH. If the timing component is above the threshold TH, the timing component is held. If below the threshold TH, the held timing component is output as the timing data TX' and TY'.

Reference numeral 9a is a timing phase hold circuit, which circuit is comprised of a vector judgement unit 90 and a hold unit 91. This circuit compares the timing components TX and TY from the timing extraction unit 4 with the threshold TH. If the vector component is greater than the threshold TH, it holds the timing components TX and TY and then outputs. If lower than the threshold TH, it outputs the held timing components TX and TY as the timing data TX' and TY'. Reference numeral 9b is an amplitude normalizing circuit, which is comprised of a vector component calculator 92 and a normalizer 93. This circuit normalizes the outputs XTMR and XTMI from the timing phase hold circuit 9a to the amplitude of a circle with a radius 1.

Reference numerals 901 and 902 are multipliers which square the timing components TX and TY. Reference numeral 903 is an adder, which adds the outputs TX2 and TY2 of the multipliers 901 and 902 to obtain the vector component TX2+TY2 of the timing components. Reference numeral 904 is a subtractor, which performs subtraction on the vector component TX2+TY2 and a predetermined threshold TH. Reference numeral 905 indicates a polarity decision unit (DEC2) which determines the polarity of the output (TX2+TY2)−TH of the subtractor 904 and makes the control output ATL "1" and BTL "0" if the polarity is positive, i.e., (TX2+TY2) ≧TH, and makes the control output ATL "0" and BTL "1" if the polarity is negative, i.e., (TX2+TY2)<TH. Reference numerals 911 and 912 are multipliers, which multiply the timing components TX and TY and the control output ATL. Reference numerals 913 and 914 are adders, which add the outputs from the multipliers 911 and 912 and the multipliers 915 and 916 to issue outputs XTMR and XTMI. The multipliers 915 and 916 multiply the outputs of the taps 917 and 918 and the control output BTL and output the results to the adders 913 and 914. The taps 917 and 918 hold the outputs XTMR and YTMI of the adders 913 and 914 and output to the multipliers 915 and 916.

Reference numerals 921 and 922 are multipliers, which multiply the outputs XTMR and XTMI by $1/\sqrt{2}$. Reference numeral 923 and 924 are multipliers which square the outputs of the multipliers 921 and 922. Reference numeral 925 is an adder, which adds the outputs of the multipliers 923 and 924 and obtains the vector component (XTMR2+YTMI2)/2. Reference numeral 931 is an inverter type read only memory (IV-ROM), which stores inverse numbers of the vector component from the adder 925 and outputs the inverse numbers in accordance with the values of the vector component. Reference numerals 932 and 933 are multipliers, which multiply the inverse outputs of the IV-ROM 931 and the outputs XTMR and YTMI and output the normalized timing components TX' and TY' to the phase rotator 6.

Figure 19:
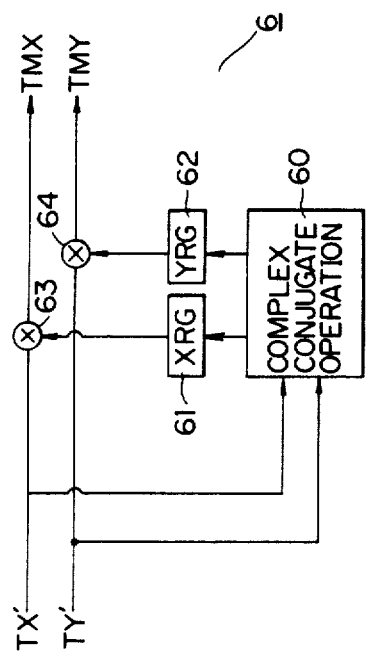

FIG. 19 is a detailed circuit diagram of the phase rotator 6 shown in FIG. 15. In the figure, 60 is a complex conjugate calculator, which calculates the complex conjugates $\sqrt{(TX12+TY13)}/TX'$ and $1/TY'$ of the normalized timing components TX' and TY' from the phase holder 49 in the timing extraction unit 4 at the time of training. Reference numerals 61 and 62 are X component and Y component registers, which store the results of the calculation of the calculator 60, i.e., the complex conjugates $(\sqrt{(TX12+TY13)}TX')/TX'$ and $(1/TY')$. Reference numerals 63 and 64 are multipliers, which multiply the normalized timing components TX' and TY' and the complex conjugates of the registers 61 and 62 for phase rotation.

Figure 20:
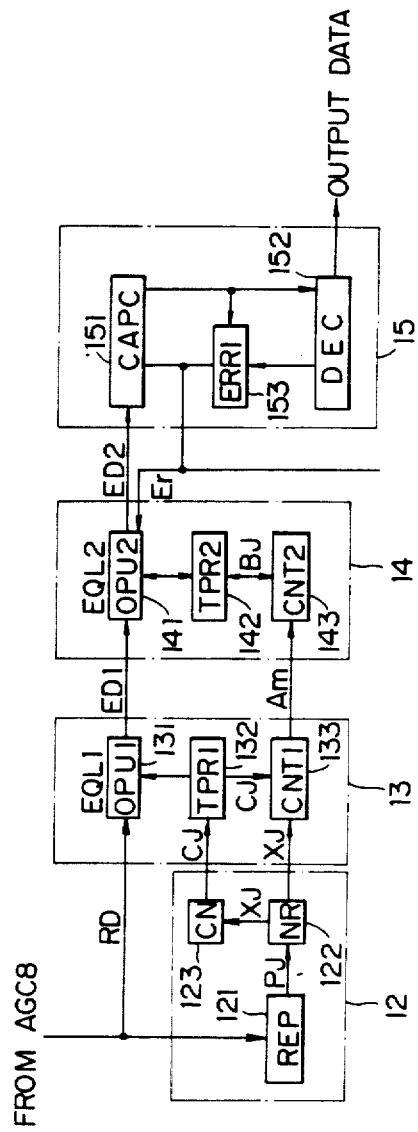

FIG. 20 is a detailed diagram of the impulse recovery unit 12, first equalizer 13, second equalizer 14, and decision unit 15 shown in FIG. 8.

The impulse recovery unit 12 has an extraction circuit (REP) 121 for extracting the data series $P_j$ corresponding to the impulse signal from inside the training signal. A normalization circuit (NR) 122 normalizes the extracted data series, and a complex conjugate circuit (CN) 123 converts the data series $X_j$ normalized at the normalization circuit (NR) 122 into complex conjugates.

The first equalizer 13 has a first equalized output circuit (OPU1) 131, which has received data RD0 from the automatic gain controller 8 written in as first tap data and which calculates the first equalized output ED1 from the first tap data and first tap coefficient $C_j$, a first tap coefficient register (TPR1) 132, which is initialized with the first tap coefficient $C_j$ from the complex conjugate circuit 123, and a first calculation control circuit (CNT1) 133, which has the data series from the normalization circuit 122 written in as second tap data and which calculates the autocorrelation series $A_m$ of impulse signal.

The second equalizer 14 has a second equalized output circuit (OPU2) 141, which has the equalized output data ED1 written in as third tap data and which calculates the second equalized output ED2 from the third tap data ED1 and the second tap coefficient $B_j$, a second tap coefficient register (TPR2) 142, which stores the second tap coefficient $B_j$, and a second calculation control circuit (CNT2) 143, which has the autocorrelation series $A_m$ of the impulse from the first calculation control circuit 133 written in, which finds the n-th approximation of the inverse matrix from the autocorrelation series $A_m$, and which calculates the equalized output from the autocorrelation series $A_m$ of the impulse and the second tap coefficient $B_j$ to correct the second tap coefficient $B_j$ based on the error with the reference output Ref. The decision unit 15 has a carrier automatic phase control circuit (CAPC) 151, a decision circuit (DEC) 152, and an error calculation circuit (ERR1) 153.

FIG. 21D is a waveform chart of the recovered impulse, FIGS. 22A and 22B are views for explaining phase holding, and FIG. 23 is a flow chart of the initialization operation.

First, an explanation will be made of the initialization of the first equalizer 13 and second equalizer 14 with reference to FIG. 21 and FIG. 23.

Step S010

A received data series, which is denominated by a complex number corresponding to the training signal TR demodulated at the demodulator 3, the roll-off filter 5, and the automatic gain controller 8 is supplied to the impulse extraction circuit 121, where the received data series is added to the delayed data series obtained by delaying the received data series by one data symbol. That is, as shown in FIG. 21, the training data SA1 and the delayed data SA2 obtained by delaying the training data SA1 by one data symbol is added, whereby an impulse series SA3, which is an impulse recovery signal SA3 having only a central component $P_0$ whose amplitude is not zero and other components of zero is produced. The impulse recovery signal SA3 shown in FIG. 21C shows an ideal case where no distortion of the line exists. However, in practice, as shown in FIG. 21D, the impulse series $P_j (j=0, \pm 1, \pm 2 \ldots \pm n)$ distorted due to the line is obtained.

Step S020

The data series $P_j$ corresponding to the extracted impulse is supplied to the normalization circuit 122, where it is normalized. The normalization circuit 122 calculates the magnitude of the data series $P_j$, i.e., the 0th correlation, by the following formula:

$$P^2 = P_n \cdot P_n{}^* + P_{n-1} \cdot P_{n-1}{}^* \tag{3}$$
$$= \ldots + P_0 \cdot P_0{}^* + \ldots + P_{-n} \cdot P_n{}^*$$

where, $P_n{}^*$ is the complex conjugate of $P_n$ $$\text{i.e., } P^2 = \sum_{K=-n}^{n} P_K \cdot P_K{}^* \tag{4}$$

Next, the data series Pj is divided by P so as to normalize the impulse. If the normalized data series is $X_j$, $X_j$ is given by the following equation:

$$X_j = P_j/P \tag{5}$$

Step S030

The normalized data series $X_j$ is supplied to the complex conjugate circuit 123. The complex conjugate converted data series $C_j$ is initialized in the first tap coefficient register TPR 132 as a tap coefficient $C_j$ of the first equalizer 13.

$$C_j = X_j{}^* = P_K{}^*/P \tag{6}$$

Step S040

The normalized data series $X_j$ and the complex conjugate data $C_j$ are supplied to the calculation circuit 1 of the first equalizer 13 and the autocorrelation series $A_m$ is calculated. The calculation of the autocorrelation series $A_m$ is performed as follows. First, for the 0th correlation $A_0$, $$A_0 = \sum_{K=-n}^{n} X_K \cdot C_K = \sum_{K=-n}^{n} (P_K/P) \cdot (P_K{}^*/P) \tag{7}$$

$$= \sum_{K=-n}^{n} P_K \cdot P_K{}^*/P^2 = (1, 0)$$

The complex numbers are expressed by real parts and imaginary parts. for the remaining $A_m$, $$A_m = \sum_{K=-n}^{n} X_{K+m} \cdot C_K = \sum_{K=-n}^{n} (P_{K+m}/P) \cdot (P_K{}^*/P) \tag{8}$$

-continued $$= \sum_{K=-n}^{n} P_{K+m} \cdot P_K^*/P^2 = \sum_{K=-n}^{n} P_{K+m} \cdot P_K^*/\sum_{K=-n}^{n} P_K \cdot P_K^*$$

Here, it is found that $A_{-m} = A_m^*$. In other words, the autocorrelation series $A_m$ is symmetric. The autocorrelation series $A_m$ can be considered to be the result of deformation of the impulse by the line L and first equalizer 13. Therefore, in the second equalizer 14, it is required that inverse characteristics of the symmetrical impulse characteristics be given.

Step S050 1

The autocorrelation series $A_m$ is supplied to the calculation circuit 143 of the second equalizer 14, where the series $B_{j(1)}$, a primary approximation of the inverse characteristics matrix, is found as follows:

$$B_{j(1)} = -A_{-j} = -A_j^* \quad (j \neq 0) \tag{9}$$

$$B_{0(1)} = A_0 = (1, 0) \tag{10}$$

The series $B_{j(1)}$ found in this way is used for finding the inverse matrix and as the initialization value.

Step S060

The data series $B_{j(1)}$ obtained in step S050 as the tap coefficient $B_j$ of the second equalizer 14 is used to calculate the equalized output S, with the autocorrelation series $A_m$ as the tap data. The equalized output S is compared with the reference output series Ref and $B_j$ is successively corrected so as to bring the error close to zero.

The equalized output S is the data series $S_L$ given by $$S_L = \sum_{K=-n}^{n} B_K \cdot A_{K+L} \tag{11}$$

The correction of the tap coefficient $B_j$ is performed using the following successive approximation:

$$B_0^{(n+1)} = B_0^{(n)} + E \cdot A_0^* \tag{12}$$

$$= B_0^{(n)} + (\text{Ref} - S) \cdot 1$$

$$= B_0^{(n)} + Er$$

where, Er is the real part of E.
For the other $B_j$, $$B_j^{(n+1)} = B_j^{(n)} + E \cdot A_0^* \tag{13}$$

$$= B_j^{(n)} + E(\text{Ref} - S) \cdot 1$$

$$= B_j^{(n)} + (\text{Ref} - S)$$

$$= B_j^{(n)} - S_j$$

In the correction of $B_j$, the central tap is dominant, so the correction is performed in the following order:

$$B_0 \to B_{\pm 2} \to \ldots \to B_{\pm n} \to B_0 \to B_{\pm 1}$$

The data series $B_j$ found in this way is symmetric since the input series $A_m$ is symmetric. In other words, $B_j = B_{-j}$. In this way, the tap coefficient $B_j$ of the second equalizer 14 is initialized and set in the tap coefficient register 142.

With the above steps, the initializations of the tap coefficients $C_j$ and $B_j$ of the automatic equalizers 13 and 19 are completed. In other words, the complex conjugate of the impulse response of the line L is set in the first equalizer 13 as the tap coefficient $C_j$ and the second equalizer 14 is used as a symmetrical equalizer having a symmetrical matrix as its contents. Since the complex conjugate of the impulse response is set in the first equalizer 13 as a tap coefficient, autocorrelation is exhibited. Therefore, an output is obtained unrelated to the timing phase and the timing pull-in is performed instantaneously. That is, the output of the first equalizer 13 is one on which timing phase correction is performed.

Next, an explanation will be made of the initialization of the timing recovery with reference to FIGS. 22A and 22B.

The received data series of the training signal TR of the afore-mentioned step S010 is input into the timing extraction unit 4. At the timing extraction unit 4, the timing components are extracted by the timing extraction filters 41 and 42. These are then squared by the squaring circuits 43 and 44 and added by the adder 45, whereafter the power is sought. The alternating component is cut by the low pass filter 46 and the timing X component TX is obtained. Further, the timing Y component TY is prepared from the timing X component TX by the 90 degree component detector 47. If the timing components TX and TY are given from the timing extraction unit 4 to the timing phase hold circuit 9a of the timing phase holder 9, the timing components TX and TY are squared by the multipliers 901 and 902 of the vector judgement unit 90. The results are added by the adder 903 and the vector component $(TX^2 + TY^2)$ is obtained. This vector component has subtracted from it the threshold TH by the subtractor 904 and then is applied to the polarity decision unit 905. The polarity decision unit 905 makes the control output ATL "1" and the control output BTL "0" if the output of the subtractor 905 is positive, i.e., vector component $(TX^2 + TY^2) \geq TH$. Therefore, if the vector component is greater than or equal to TH, the timing components TX and TY are output from the multipliers 911 and 912 to the adders 913 and 914 as they are. On the other hand, since the control output BTL is "0", the multipliers 915 and 916 do not output to the adders 913 and 914. The timing components TX and TY are therefore output from the adders 913 and 914 as the outputs XTMR and XTMI and held by the taps 917 and 918.

Conversely, the polarity decision unit 905 makes the control output ATL "0" and the control output BTL "1" if the vector component (TX2+TY2) is less than TH. Since the control output BTL is "1", the held values of the taps 917 and 918 are input into the adders 913 and 914 and the held values of the taps 917 and 918 are output as the outputs XTMR and YTMI of the adders 913 and 914.

Therefore, if the vector component of the timing component as shown in FIG. 22A is greater than or equal to the threshold TH, the timing components TX and TY are output and held. Conversely, if the vector component of the timing component is less than the threshold, the prior held timing component is output.

The outputs XTMR and YTMI are applied to the circuit 9b for normalizing the amplitude and are multiplied by $1\sqrt{2}$ by the multipliers 921 and 922 of the vector component calculator 92. Further, they are squared by the multipliers 923 and 924 and added by the adder 925. In this way, the vector component (XTMR2 + YTMI2)/2 is obtained.

The IV-ROM 931 outputs the inverse numbers of the vector component. The outputs XTMR and YTMI are multiplied with the inverse numbers by the multipliers 932 and 933, whereby the timing data TX' and TY' shown in FIG. 10 with the radius 1 are obtained.

Therefore, the portion from the time $t_1$ to the time $t_2$ of FIG. 22A below the threshold is replaced by the timing component of the time $t_1$ above the threshold as shown in FIG. 22B. In other words, during the portion below the threshold, the phase of the timing component just prior to that is held and output. The timing phases during that time become the same even if they were actually varied. During this time, desynchronization occurs and the phase jitter increases, but the time where the timing component is small does not continue long and further the phase fluctuation during that time is small, so substantially the minimum phase jitter can be obtained.

On the other hand, when the timing component is small, even if a synchronization operation is performed, synchronization may not be possible or the synchronization operation may be erroneous, so the phase jitter can become large.

This timing data TX' and TY' is input to the phase rotator 6. As previous mentioned, during the training, the complex conjugate calculator 60 takes the complex conjugate values of the timing data TX' and TY' and sets them into the registers 61 and 62.

In this way, in anticipation of the completion of the initialization in the receiver side MODEM, the transmitter side MODEM commences the transmission of the send data. At the receiver side MODEM, the received data signal is demodulated to the data series by the demodulator 3 and supplied to the first equalizer 13. In the first equalizer 13, the received data series is processed by the equalized output circuit 131 using the tap coefficient $C_j$ of the tap coefficient register 132 to calculate the first equalized output ED1. The equalized output data series ED1 from the first equalizer 13 is supplied to the equalized output circuit 141 of the second equalizer 14, where the second tap coefficient $B_j$ is used to calculate the final equalized output data ED2. Further, the equalized output ED2 is judged as to data by the judgement unit 15 and output as output data. Further, the error between the output data and the equalized output ED2 is used, via the second equalized output circuit 141, to correct the second tap coefficients $B_j$ of the second tap coefficient register 142.

The above-mentioned demodulated data series is input to the timing extraction unit (TMGEXT) 4, where the timing components TX' and TY' are extracted. These are then amplitude corrected at the phase holder 9, normalized, and input to the phase rotator 6. At the phase rotator 6, the normalized timing components TX' and TY' are multiplied by the multipliers 63 and 64 with the complex conjugates of the registers 61 and 62 for phase rotation and control of the phase-locked loop 7. At the phase-locked loop 7, the phase jitter is adjusted.

Figure 24:
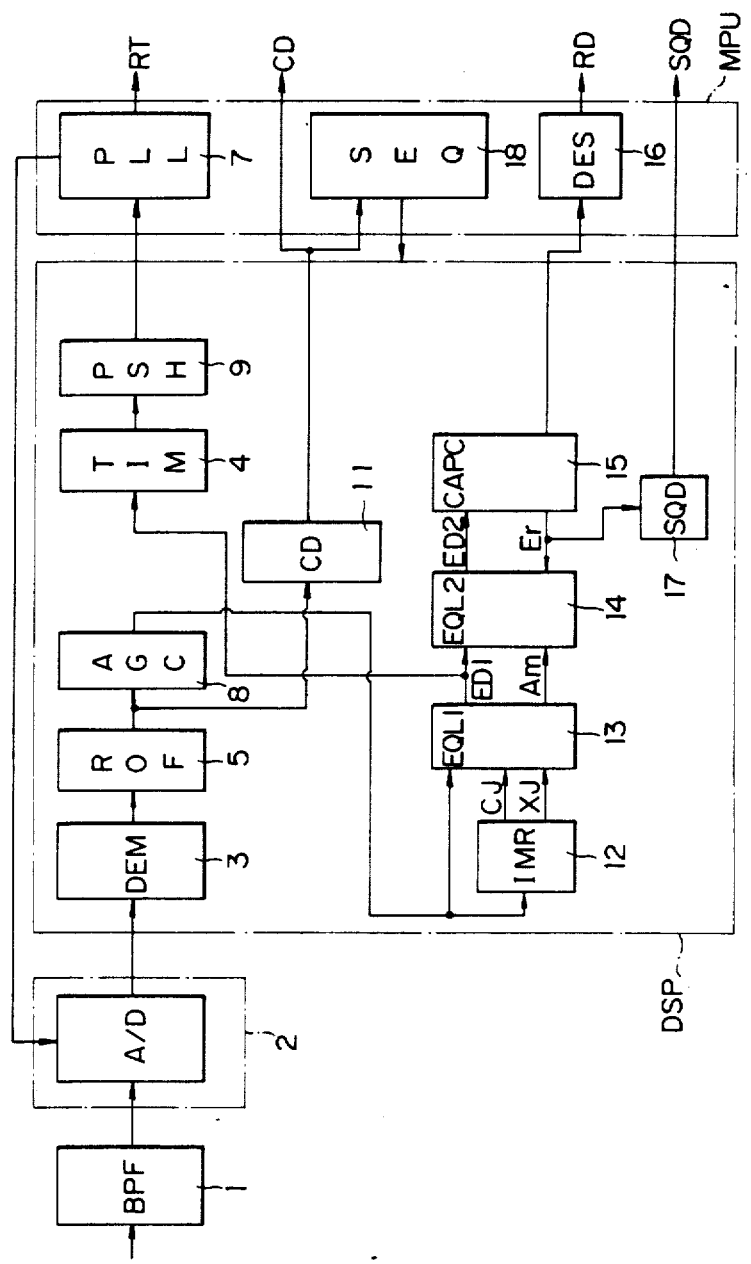
FIG. 24 is another embodiment according to the present invention.

Although a preferred embodiment has been described heretofore, various modifications and alterations are possible within the scope of the present invention. For example, FIG. 24 is a structural view of another embodiment of the present invention. In the figure, portions the same as those shown in FIG. 15 are indicated by the same references. In this embodiment, a phase rotator 6 is not provided in comparison with the equipment of FIG. 8. The timing extraction unit 4 is designed to perform the timing recovery from the equalized output ED1 of the first equalizer (EQL1) 13. Further, in this embodiment, the processing of the digital signal processor DSP and the microprocessor MPU is shown by equivalent blocks.

The demodulator 3, the roll-off filter 5, and AGC 8 are the same as in FIG. 17. The timing extraction unit 4 and the phase holder 9 are the same as in FIG. 18. The impulse recovery unit 12, the first equalizer 13, the second equalizer 14, and the judgement unit 15 are the same as in FIG. 20.

The initialization in this embodiment may be just enough for the afore-mentioned initialization of the first equalizer 13 and the second equalizer 14, by which timing pull-in and equalization pull-in training are performed. That is, the phase component has been erased from the equalized output ED1 of the first equalizer 13, i.e., the phase of the equalized output ED1 is zero. Therefore, since the timing extraction unit 4 of FIG. 23 performs a timing recovery from the equalized output ED1, a phase rotation is not necessary for supplying the timing component to the phase-locked loop 7. Therefore, during the data reception, no phase rotation is necessary, and the phase-locked loop 7 is adjusted as to phase jitter by the output of the timing extraction unit 4.

In this embodiment, compared with the afore-mentioned embodiment, there is the advantage that no initial setting for the phase rotation or rotation operation are required. However, at a transmission speed of 9600 baud the first equalizer 13 must process at 9.6 kHz. Higher speed processing is sought compared with the construction of FIG. 15. Further, there are sometimes delay effects due to the first equalizer 13.

We claim:

1. A timing pull-in device of a receiving equipment comprising:
   means for sampling a received signal from a transmission line by a certain sampling timing and demodulating the received signal;
   means for extracting a timing signal from the demodulated signal;
   means for phase-rotating the extracted timing signal by an amount of rotation phase previously set;
   means for adjusting the sampling timing of the received signal by carrying out a phase-locked loop control on the basis of the phase-rotated timing signal;
   means for recovering an impulse from the demodulated signal;
   a first equalizing means for fix-equalizing the demodulated signal by using a tap coefficient previously set; and
   a second equalizing means for automaticequalizing the equalized output of the first equalizing means to obtain an output signal;
   wherein, at the time of an initial training of the receiving equipment, a training signal containing an impulse component is received from the transmitting line, the impulse is recovered from the training signal by the impulse recovering means, a complex conjugate of the recovered impulse is set to the first equalizing means as the tap coefficient for the fix-equalization, the tap coefficient for the automaticequalization is calculated from the recovered impulse to be initial-set to the second equalizing means, and the amount of the phase rotation is set to the phase rotating means so that the phase of the timing signal extracted by the extracting means coincides with the phase of an internal clock of the equipment.

2. A timing pull-in device according to claim 1, further comprising a phase holding means which stores an amplitude and a phase of the extracted timing signal from the timing extracting means when the amplitude thereof is beyond a predetermined threshold, and outputs the amplitude and the phase of the stored timing signal to the sampling timing adjusting means instead of the directly extracted timing signal of the timing extracting means when the amplitude thereof is below the predetermined threshold.

3. A timing pull-in device according to claim 2, wherein the phase rotating means comprises:
   means for calculated the complex conjugate of the extracted timing signal;
   means for storing the calculated complex conjugate; and
   means for multiplying the extracted timing signal by the calculated and stored complex conjugate to rotate the phase of the timing signal.

4. A timing pull-in device according to claim 1, wherein the means for sampling and demodulating comprises an analog-digital converter, a demodulator, and a roll-off filter.

5. A timing pull-in device according to claim 1, further comprising means for automatic gain control of the demodulated signal.

6. A timing pull-in device according to claim 1, wherein the tap coefficient to be set to the first equalizing means is found by complex-conjugating a data series obtained by normalizing the recovered impulse series.

7. A timing pull-in device according to claim 6, wherein the tap coefficient to be initial-set to the second equalizing coefficient is found by carrying out a predetermined operation upon the approximation of an inverse characteristics matrix of an autocorrelation series calculated on the basis of the tap coefficient of the first equalizing means and the normalized data series.

8. A timing pull-in device according to claim 1, wherein the demodulating means, the extracting means, the phase-rotating means, the sampling timing adjusting means, the impulse recovering means, the first equalizing means, and the second equalizing means are realized by a digital processor.

9. A method for timing pull-in for an initial training of a receiving equipment comprising the following steps:
   sampling a received signal from a transmission line by a certain sampling timing of and demodulating the received signal;
   extracting a timing signal from the demodulated signal;
   phase-rotating the extracted timing signal by an amount of phase rotation where the phase thereof coincides with a phase of an internal clock;
   adjusting the sampling timing of the received signal by carrying out a phase-locked loop control of the phase-rotated timing signal;
   recovering an impulse from a training signal containing the impulse of the demodulated signal;
   setting a complex conjugate of the recovered impulse to a fix-equalizing means as a tap coefficient for fix-equalization; and,
   initial-setting a tap coefficient for an automatic equalization calculated on the basis of the recovered impulse to an automatic-equalizing means which equalizes automatically the equalized output of the fix-equalizing means to obtain the output signal.

10. A timing pull-in device of a receiving equipment comprising:
   means for sampling a received signal from a transmission line by a certain sampling timing and demodulating the received signal;
   a first equalizing means for fix-equalizing the demodulated signal by using a tap coefficient previously set;
   a second equalizing means for automaticequalizing the equalized output of the first equalizing means to obtain an output signal;
   means for extracting a timing signal from the equalized output of the first equalizing means; and,
   means for adjusting the sampling timing of the received signal by carrying out a phase-locked loop control on the basis of the extracted timing signal,
   wherein, at the time of an initial training of the receiving equipment, a training signal containing the impulse component is received from the transmitting line, the impulse is received from the training signal by the impulse recovering means, a complex conjugate of the recovered impulse is set to the first equalizing means as the tap coefficient for the fix-equalization, and the tap coefficient for the automatic-equalization is calculated from the recovered impulse to be initial-set to the second equalizing means.

11. A method for timing pull-in for an initial training of a receiving equipment, comprising the following steps:
   sampling a received signal from a transmission line by a certain sampling timing and demodulating the received signal;
   recovering an impulse from a training signal containing the impulse of the demodulated signal;
   setting a complex conjugate of the recovered impulse to a fix-equalizing means as a tap coefficient for fix-equalization;
   initial-setting a tap coefficient for an automatic equalization calculated on the basis of the recovered impulse to an automatic-equalizing means which equalizes automatically the equalized output of the fix-equalizing means to obtain the output signal;
   extracting a timing signal from the equalized output of the fix-equalizing means; and,
   adjusting the sampling timing of the received signal by carrying out a phase-locked loop control of the extracted timing signal.

12. A method for recovering timing of data receiving equipment which demodulates a received signal from a line, fix-equalizes the demodulated signal by a set tap coefficient, and automatically equalizes the fix-equalized output to obtain the output data, comprising the following steps:
   extracting a timing signal from the demodulated signal, and phase rotating the extracted timing signal by a set phase;
   setting a complex conjugate of a recovered impulse recovered in response to a training signal including an impulse component transmitted from a transmission side at the training time as a tap coefficient for the fix-equalization, initial setting a tap coefficient for automatic equalization obtained by using the recovered impulse, and setting a timing phase to the phase rotation part in accordance with the training signal.

13. A method for recovering timing of data receiving equipment which demodulates a received signal from a line, fix-equalizes the demodulated signal by a set tap coefficient and automatically equalizes the fix-equalized output to obtain the output data, comprising the following steps extracting a timing signal from the fix-equalized output and;

setting a complex conjugate of a recovered impulse recovered in response to a training signal including an impulse component transmitted from a transmission side at the training time as a tap coefficient for the fix-equalization, and initally setting the automatic equalization.

14. A method for timing synchronization of a receiving equipment comprising:

performing a timing extraction step for extracting a timing component from an input signal;

performing a phase hold step for holding the amplitude and phase of the extracted timing component when the amplitude thereof is beyond a predetermined threshold and outputting the held amplitude and phase of the timing component when the amplitude thereof is below the predetermined threshold; and performing a synchronization step for carrying out a synchronous operation on the basis of the output of the phase hold step.

* * * * *

UNITED STATES PATENT AND TRADEMARK OFFICE
CERTIFICATE OF CORRECTION

PATENT NO. : 4,694,469
DATED : September 15, 1987
INVENTOR(S) : KAKU et al.

It is certified that error appears in the above-identified patent and that said Letters Patent is hereby corrected as shown below:

Col. 2, line 47, change "menas" to --means--;

line 58, change "initlal" to --initial--.

Col. 9, line 13, change "$e^{j-\theta}$" to --$e^{-j\theta}$--.

Col. 11, line 25, change "(taps)" to --(tap T)--.

Col. 13, line 8, change "$(\sqrt{(TX12 + TY13)TX'})/TX'$" to --$(\sqrt{(TX12 + TY13)TX'})/TX'$--.

Col. 19, line 19, change "calculated" to --calculating--;

line 54, delete "of".

Col. 21, line 10, after "steps" insert --:--.

Signed and Sealed this

Fifth Day of July, 1988

*Attest:*

DONALD J. QUIGG

*Attesting Officer*　　　*Commissioner of Patents and Trademarks*